(12) United States Patent
Shibasaki (10) Patent No.: US 9,304,284 B2
(45) Date of Patent: Apr. 5, 2016

(54) LENS APPARATUS AND IMAGE PICKUP APPARATUS INCLUDING THE SAME

(71) Applicant: CANON KABUSHIKI KAISHA, Tokyo (JP)

(72) Inventor: Gou Shibasaki, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/138,911

(22) Filed: Dec. 23, 2013

(65) Prior Publication Data

US 2014/0185153 A1 Jul. 3, 2014

(30) Foreign Application Priority Data

Dec. 28, 2012 (JP) .................................. 2012-288334

(51) Int. Cl.
*G02B 7/10* (2006.01)
*G02B 7/02* (2006.01)
*G02B 7/04* (2006.01)

(52) U.S. Cl.
CPC ... *G02B 7/10* (2013.01); *G02B 7/02* (2013.01); *G02B 7/04* (2013.01)

(58) Field of Classification Search
CPC .......... G02B 7/102; G02B 7/10; G02B 15/14; G02B 7/04; G02B 7/02; G02B 7/023; G02B 7/021; G02B 13/003; G02B 13/0035; G02B 7/08

USPC .................................. 359/811–830, 694–706
See application file for complete search history.

(56) References Cited

U.S. PATENT DOCUMENTS

2003/0174412 A1\* 9/2003 Noguchi ........................ 359/694
2009/0059401 A1\* 3/2009 Yamazaki ...................... 359/826

FOREIGN PATENT DOCUMENTS

JP 08-86947 A 4/1996
JP 2012-053271 A 3/2012

\* cited by examiner

*Primary Examiner* — Scott J Sugarman
*Assistant Examiner* — Alberto Betancourt
(74) *Attorney, Agent, or Firm* — Rossi, Kimms & McDowell LLP (57) ABSTRACT

A lens apparatus includes: a fixed barrel with a movable barrel therein holding an optical element and moving along an optical axis; a first operating unit rotatable outside the fixed barrel; a movable stop in the fixed barrel, the stop including a movable unit rotatable to change aperture diameter; a second operating unit outside the fixed barrel; and transmission barrel engaging with the fixed barrel in the fixed barrel and connected to the second operating unit at a first portion and to the movable unit of the stop at a second portion, the transmission barrel having an opening between the first and second portions separated from each other in the optical axis direction, in which the movable barrel is connected to the first operating unit through the opening of the transmission barrel, and moves along the optical axis by a rotation-translation converting mechanism by rotating the first operating unit.

8 Claims, 6 Drawing Sheets

LENS APPARATUS AND IMAGE PICKUP APPARATUS INCLUDING THE SAME

BACKGROUND OF THE INVENTION

1. Field of the Invention

The present invention relates to a lens apparatus for adjusting focus or zooming through movement of an optical element in an optical axis direction thereof. In particular, the present invention relates to a lens apparatus having a function of adjusting a light amount through rotation of an operating member arranged on an outer circumferential portion of the lens apparatus, and to an image pickup apparatus including the lens apparatus.

2. Description of the Related Art

According to the related art, there is known a lens apparatus in which an operating member arranged on an outer circumferential portion of the lens apparatus and a movable stop arranged in the lens apparatus for changing an aperture diameter are mechanically interlocked and the light amount is adjusted through manual rotation of the operating member. In this lens apparatus, the operating member on the outer circumferential portion and the movable stop are usually arranged close to each other in an optical axis direction of the lens apparatus. However, due to a positional restriction of the operating member and a restriction on optical design of a position of the stop, the operating member and the movable stop may be arranged across an optical element that moves in the optical axis direction for adjusting focus or zooming. In this case, it is necessary to provide a structure for transmitting a rotational drive force in the lens apparatus.

As a method of transmitting the rotational drive force in the lens apparatus so as to change the aperture diameter of the movable stop, Japanese Patent Application Laid-Open No. H08-86947 discloses a structure transmitting the rotational drive force by a lever member inserted through a cutout formed in a part of a lens barrel that moves in the optical axis direction. In addition, Japanese Patent Application Laid-Open No. 2012-53271 discloses a method of transmitting the rotational drive force by a stop control member including multiple long rod-like members and ring-like members fixed to both ends of the rod-like member.

However, when the rotational drive force is transmitted by the long-arm lever member as in Japanese Patent Application Laid-Open No. H08-86947, a delay of aperture diameter change with respect to an operation amount of the operating member or an untraceable operation range thereof may be generated because of a tip vibration of the lever member due to a distortion of the lever member or a movable portion backlash. In addition, there is another problem in that a difference in aperture diameter between forward and backward movements occurs when forward and backward rotation is performed.

On the other hand, as described in Japanese Patent Application Laid-Open No. 2012-53271, when using the transmitting member in which the two ring members arranged on front and rear sides are connected through multiple rod-like members, the above-mentioned distortion and vibration are suppressed, but there is a problem in that the number of components is large. When the number of components of the transmitting member is large, dimensional errors of the components and assembly variations are accumulated. Therefore, there are problems in that a stop indicator engraved on the operating member and the aperture diameter cannot match with each other at high accuracy, and that an assembly procedure becomes complicated.

SUMMARY OF THE INVENTION

Therefore, the present invention provides a lens apparatus that includes an operating member and a movable stop for adjusting a light amount, which are arranged across an optical element movable in an optical axis direction thereof, and realizes highly accurate light amount adjustment superior in matching degree between a stop indicator and an aperture diameter, and in traceability.

In order to achieve the above-mentioned object, according to one embodiment of the present invention, there is provided a lens apparatus, including: a fixed barrel; a first operating member rotatable in a circumferential direction at a position on an outer side of the fixed barrel; a movable lens barrel arranged on an inner diameter side of the fixed barrel, the lens barrel holding an optical element and being movable in an optical axis direction; a movable stop arranged on the inner diameter side of the fixed barrel, the movable stop including a movable member rotatable to change an aperture diameter; a second operating member arranged on the outer side of the fixed barrel; and an actuation transmission barrel engaging with the fixed barrel at a position on the inner diameter side of the fixed barrel, the actuation transmission barrel being connected to the second operating member at a first engaging portion and to the movable member of the movable stop at a second engaging portion separated from the first engaging portion in the optical axis direction, the actuation transmission barrel having an opening formed between the first engaging portion and the second engaging portion in the optical axis direction, in which the movable lens barrel is connected to the first operating member through the opening of the actuation transmission barrel, and in which the movable lens barrel moves in the optical axis direction by a rotation-translation converting mechanism through rotation of the first operating member.

According to one embodiment of the present invention, it is possible to provide the lens apparatus that includes the operating member and the movable stop for adjusting the light amount, which are arranged across the optical element movable in the optical axis direction thereof, and realizes highly accurate light amount adjustment superior in matching degree between the stop indicator and the aperture diameter, and in traceability.

Further features of the present invention will become apparent from the following description of exemplary embodiments with reference to the attached drawings.

DESCRIPTION OF THE EMBODIMENTS

Now, exemplary embodiments of the present invention are described in detail with reference to FIGS. 1 to 5.

First Embodiment

Figure 1:
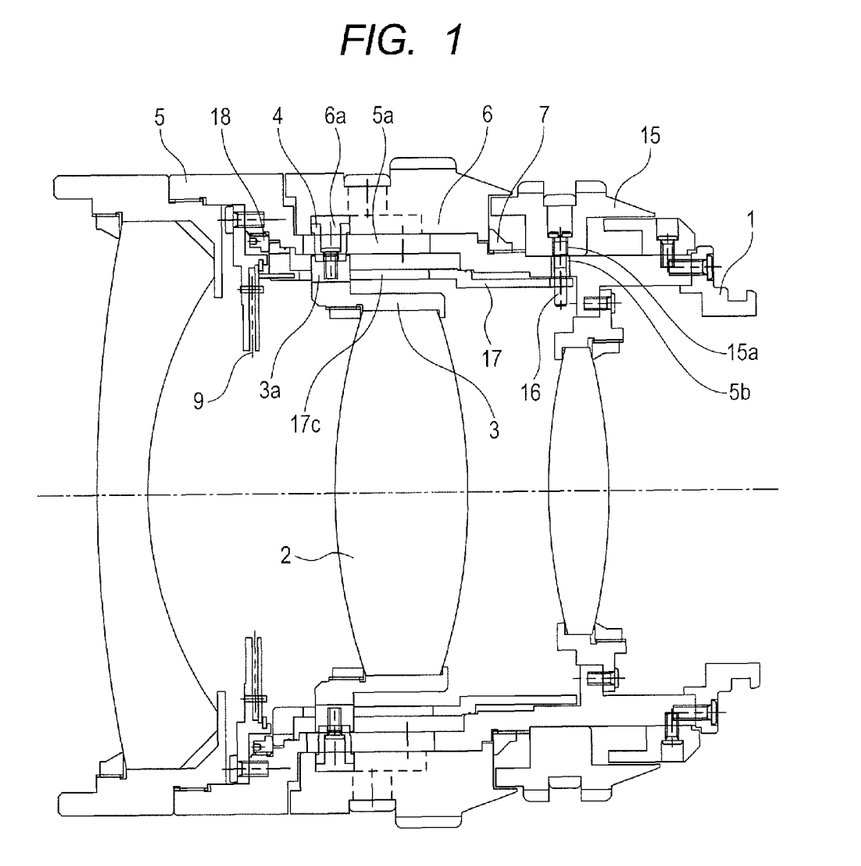
FIG. 1 is a side cross-sectional view of a lens apparatus according to a first embodiment of the present invention.
Figure 2:
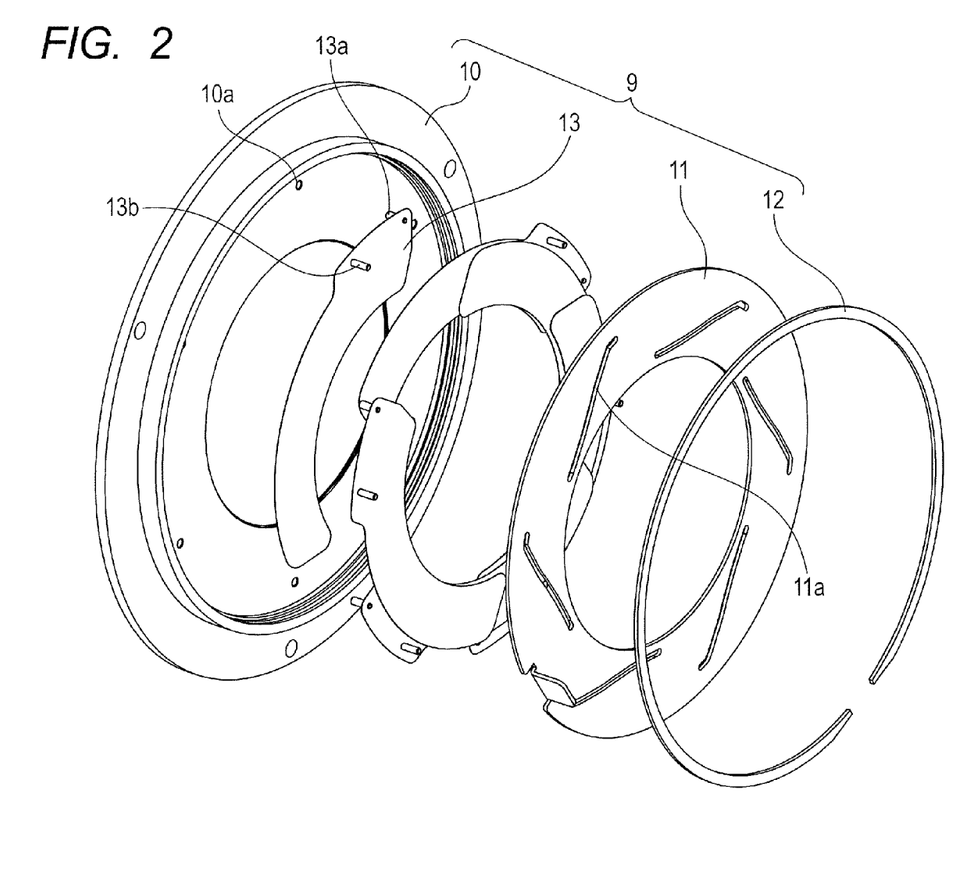
FIG. 2 is an exploded perspective view of a movable stop according to the first embodiment.
Figure 3:
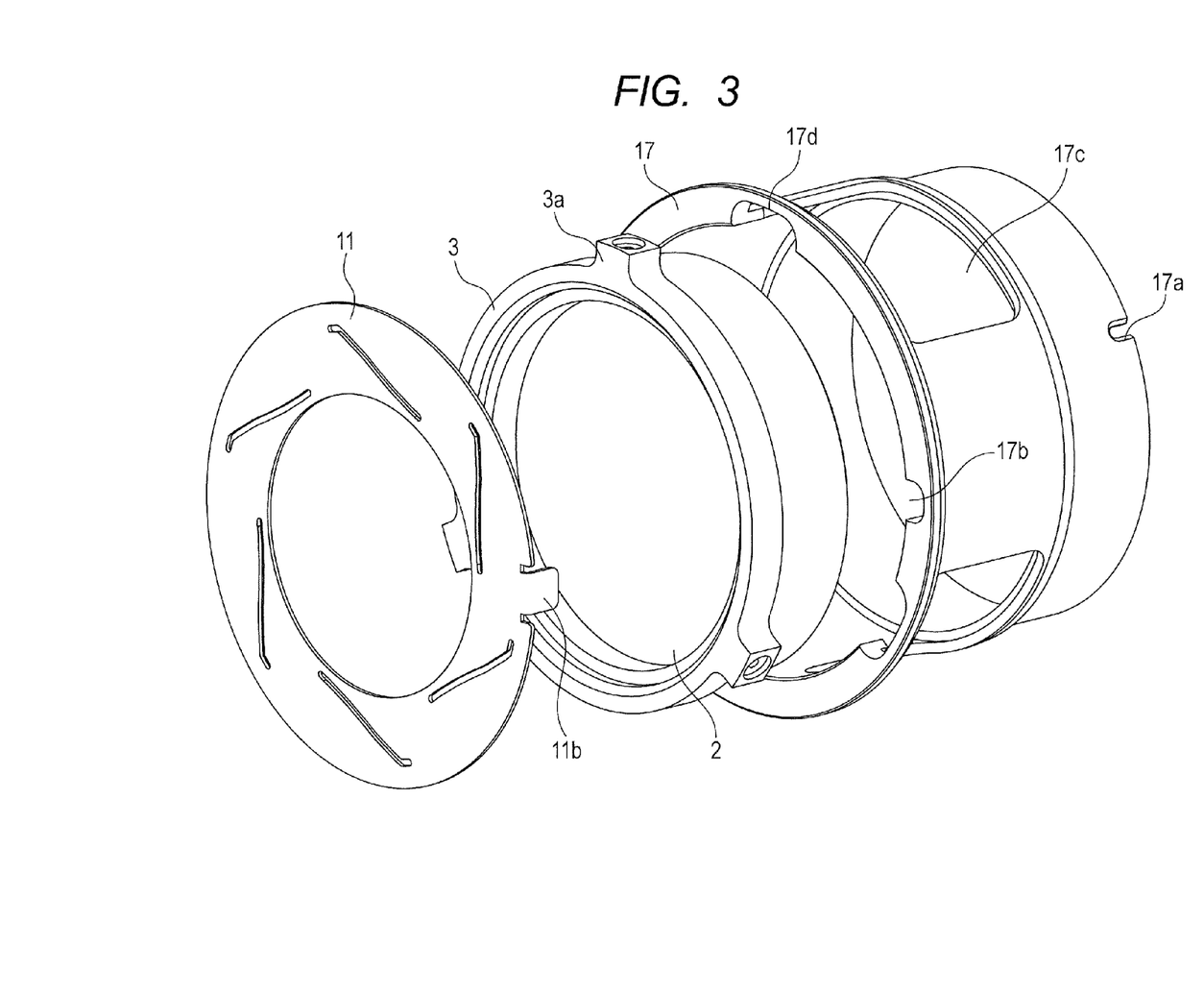
FIG. 3 is an exploded perspective view of a main part of the lens apparatus according to the first embodiment.
Figure 4:
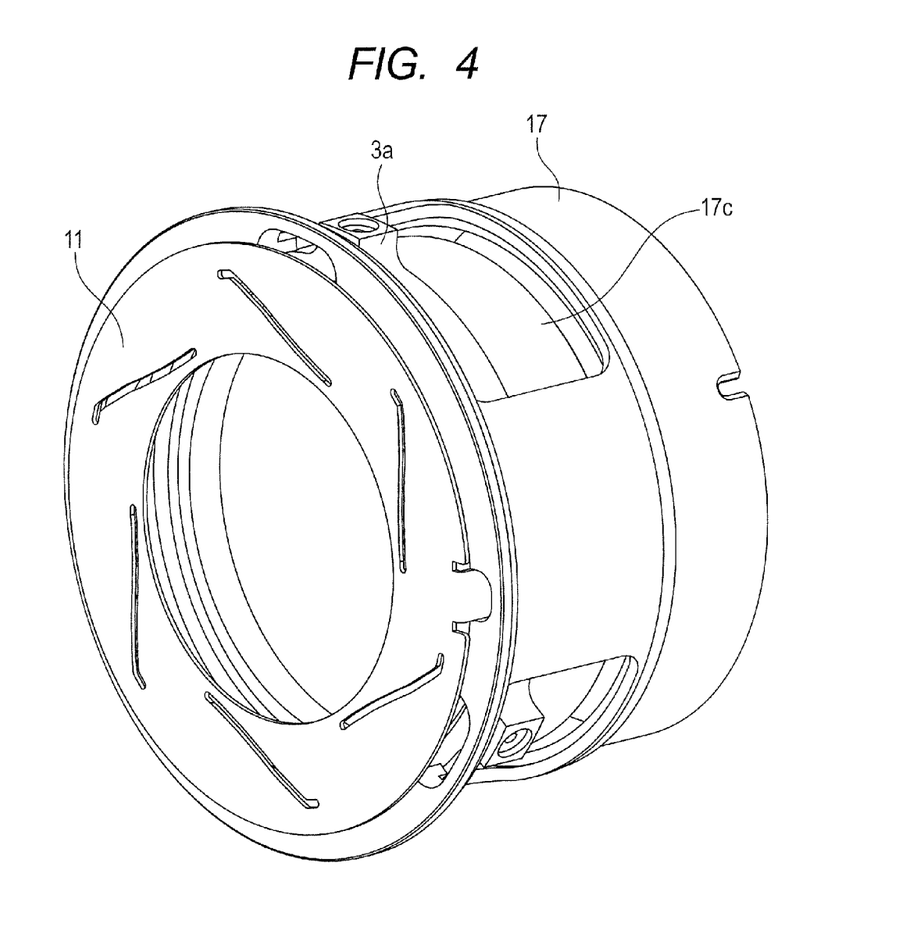
FIG. 4 is a perspective view of the main part of the lens apparatus according to the first embodiment.

FIG. 1 is a side cross-sectional view of a lens apparatus according to a first embodiment of the present invention. FIG. 2 is an exploded perspective view of a movable stop in the lens apparatus. In addition, FIGS. 3 and 4 are perspective views of a main part of a structure for transmitting a rotational drive force in this embodiment.

Figure 6:
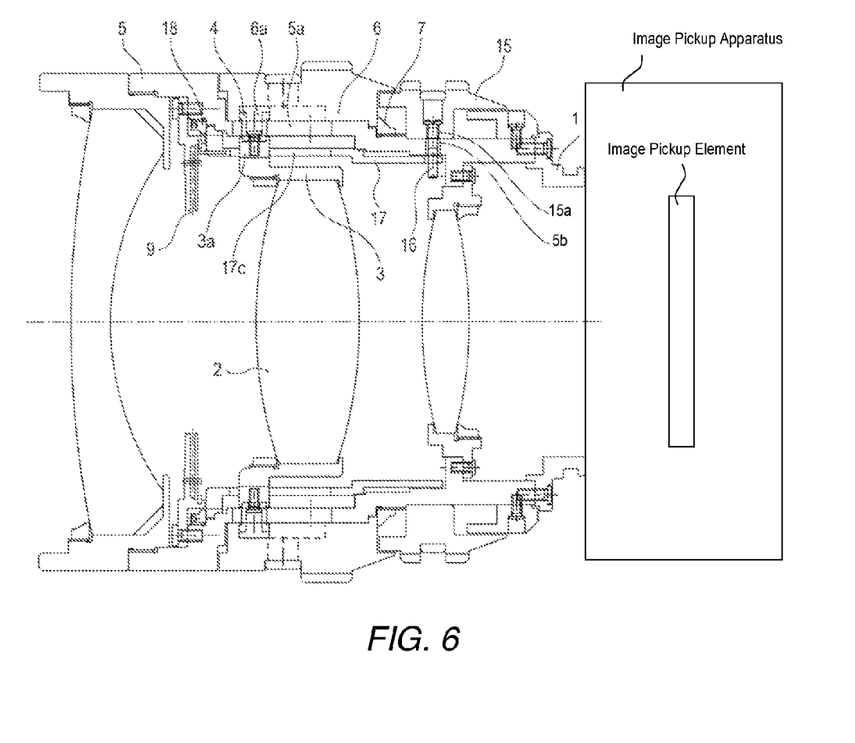
FIG. 6 is a side cross-sectional view of an image pickup apparatus embodying the lens apparatus according to the first embodiment.

The left side of FIG. 1 corresponds to an object side, and the lens apparatus is connected to an image pickup apparatus (See FIG. 6) with a mount 1 when photographing. Inside a lens barrel, an optical element 2 for adjusting focus is held by a movable lens barrel 3. On an outer circumferential portion of the movable lens barrel 3, three projected portions 3a (maximum diameter portions) are provided, and three cam pins 4 extending in directions perpendicular to the optical axis are fixed with intervals of 120 degrees around the optical axis. The three cam pins 4 engage with both three linear elongated openings 5a (first cam grooves) formed in a fixed barrel 5 to extend in the optical axis direction with the same phases, and cam grooves 6a (second cam grooves) formed in a focus operating ring 6 (first operating member) engaging with an outer circumferential portion of the fixed barrel 5 with the same phases. Further, the three cam pins 4 can slide smoothly.

The focus operating ring 6 arranged on an outer side of the fixed barrel 5 includes an engaging portion that engages with the fixed barrel 5, and the engaging portion can smoothly rotate about the optical axis. The movement of the focus operating ring 6 in the optical axis direction is restricted by a focus operating ring presser 7 that threadedly engages with the fixed barrel 5. In addition, an object distance indicator is engraved on the outer circumferential portion (not shown) of the focus operating ring 6.

With the structure described above, the engagement between the linear elongated opening 5a formed in the fixed barrel 5 and the cam in 4 restricts rotation of the movable lens barrel 3 about the optical axis. Therefore, when a photographer rotates the focus operating ring 6 about the optical axis, the engagement between the cam groove 6a of the focus operating ring 6, which is formed in the focus operating ring 6, and the cam pin 4 guides the movable lens barrel 3 to move in the optical axis direction so that focus adjustment can be performed. On the other hand, a movable stop 9 for adjusting a light amount is arranged closer to the object side than the optical element 2. The movable stop 9 includes a cam plate supporting barrel 10, a cam plate 11, a presser washer 12, and multiple stop diaphragms 13 as illustrated in FIG. 2. A fixed pin 13a projected from the surface of the stop diaphragm 13 on the object side engages with an engaging opening 10a formed in the cam plate supporting barrel 10. A movable pin 13b projected from the opposite surface of the stop diaphragm 13 on the image side engages with a cam elongated opening 11a formed in the cam plate 11. With the structure described above, when the cam plate 11 is rotated about the optical axis relatively to the cam plate supporting barrel 10, the movable pin 13b is guided along the cam elongated opening 11a so that the stop diaphragm 13 pivots about an axis of the fixed pin 13a. Because the multiple stop diaphragms 13 act in the same manner, an aperture diameter formed by the multiple overlapping stop diaphragms 13 can be changed.

A stop operating ring 15 (second operating member) having the outer circumferential portion on which a brightness indicator is engraved is positioned closer to the image side than the focus operating ring 6, and engages with the outer circumferential portion of the fixed barrel 5. The stop operating ring 15 includes an engaging portion that can rotate smoothly, and a stop interlocking pin 16 that extends to an inner diameter side of the fixed barrel 5 and threadedly engages with a threaded hole 15a. A part of the engaging portion of the fixed barrel 5 that engages with the stop operating ring 15 is provided with a long elongated opening 5b through which the stop interlocking pin 16 is inserted. Within an angle range of an operational rotation angle the stop, the stop interlocking pin 16 can rotate integrally with the stop operating ring 15 without interfering with the fixed barrel 5.

Next, a structure for transmitting rotation of the stop interlocking pin 16 to the cam plate 11 is described.

On an inner circumference side of the fixed barrel 5, an actuation transmission barrel 17 is arranged in a smoothly rotatable manner, and engages with the inner circumference of the fixed barrel 5 at two positions separated in the optical axis direction on the object side and the image side of the linear elongated opening 5a. Movement of the actuation transmission barrel 17 in the optical axis direction is restricted by a transmission barrel presser 18 threadedly engaging with the fixed barrel 5. In addition, on an end portion of the actuation transmission barrel 17 on the image side, an engaging groove 17a (first engaging portion) is formed at one position as illustrated in FIG. 3 so as to engage with the stop interlocking pin 16. On the other hand, on an end portion of the actuation transmission barrel 17 on the object side that is separated from the engaging groove 17a in the optical axis direction, an engaging groove 17b (second engaging portion) is formed at one position so as to engage with an engaging piece 11b that is formed by bending a part of the cam plate 11. Further, in a part of the actuation transmission barrel 17 near each linear elongated opening 5a of the fixed barrel 5, openings 17c having a substantially rectangular shape are formed so as to extend in the optical axis direction and in a circumferential direction. The movable lens barrel 3 is smaller than the inner diameter of the actuation transmission barrel 17 provided close to the movable lens barrel 3 at the outer circumferential portion except for the projected portion 3a, but the projected portion 3a is larger than the inner diameter of the actuation transmission barrel 17, and is assembled so that the projected portion 3a is inserted through the opening 17c as illustrated in FIG. 4. Here, the substantially rectangular opening 17c has a width in the optical axis direction that can avoid interference with the projected portion 3a even when the movable lens barrel 3 moves in the optical axis direction from infinity to proximity in the entire range of the focus adjustment. Further, the opening 17c has an angle range that can avoid interference with the projected portion 3a even when the actuation transmission barrel 17 rotates about the optical axis in the entire range of the operational rotation angle of the stop. Each opening 17c has a cutout 17d provided therethrough so that the projected portion 3a inserted through the opening 17c is removable in the optical axis direction.

A procedure of assembling the main part of the lens apparatus having the above-mentioned structure is described.

First, lubricant applied to the engaging portions of the fixed barrel 5 and the actuation transmission barrel 17, and the actuation transmission barrel 17 is inserted to the fixed barrel 5 from the object side. After insertion, the transmission barrel presser 18 is threadedly engaged to an abutting surface. Next, the movable lens barrel 3 holding the optical element 2 is inserted in the optical axis direction from the object side under the state in which the cutout 17d of the actuation transmission barrel 17 and the projected portion 3a match in phase. In this state, the cam pin 4 is inserted from an intersection between the lubricated linear elongated opening 5a and the cam groove 6a, and the cam pin 4 is fixed to the movable lens barrel 3 to complete the assembly of a focus adjustment portion. Next, the preassembled movable stop 9 is inserted and fixed to the fixed barrel 5 while engaging the engaging piece 11b of the cam plate 11 with the engaging groove 17b of the actuation transmission barrel 17. Finally, in a phase in which the threaded hole 15a of the stop operating ring 15 matches with the engaging groove 17a of the actuation transmission barrel 17, the stop interlocking pin 16 is inserted and fixed to complete the assembly of an actuation transmission portion for the operation of the stop.

In the lens apparatus having the above-mentioned structure, when the stop operating ring 15 is rotated about the optical axis for adjusting the light amount, movement of the stop interlocking pin 16 coupled to the stop operating ring 15 is transmitted to the movable stop 9 through rotation of the actuation transmission barrel 17. Because the actuation transmission barrel 17 includes the opening 17c for avoiding interference with the movable lens barrel 3, the rotation operation performed on the image side of the movable lens barrel 3 can be transmitted to the object side of the movable lens barrel 3.

In the lens apparatus of this embodiment, the rotation transmitting member interposed between the stop interlocking pin 16 and the cam plate 11 is a single component, that is, the actuation transmission barrel 17. Therefore, compared with a case where the rotation transmitting member is constructed by coupling multiple components, a phase shift between the stop interlocking pin 15 and the cam plate 11 due to accumulation of dimensional errors of the components and assembly variations can be minimized. In addition, the actuation transmission barrel 17 is engaged at two positions on the object side and the image side of the linear elongated opening 5a, and hence an inclination of the actuation transmission barrel 17 caused by the movable portion backlash is very small. Thus, compared with a case where the rotation transmitting member is a long-arm cantilever plate member or the like, a delay of action of the cam plate 11 with respect to the stop interlocking pin 16 or a difference between forward and backward movements can be suppressed.

In this embodiment, the cam groove 6a (second cam groove) is formed in the focus operating ring 6, but the present invention is not limited to this structure. For instance, the effect of the present invention can also be obtained by adopting a structure in which another ring member is arranged as a separate member from the focus operating ring 6, the cam groove 6a (second cam groove) is formed in the ring member, the focus operating ring 6 and the ring member are coupled to each other with the interlocking pin, and the focus operating ring 6 is operated so as to rotate the ring member integrally.

According to the lens apparatus of this embodiment, it is possible to realize highly accurate light amount adjustment that is superior in matching degree between the stop indicator and the aperture diameter, and in traceability.

Second Embodiment

Figure 5:
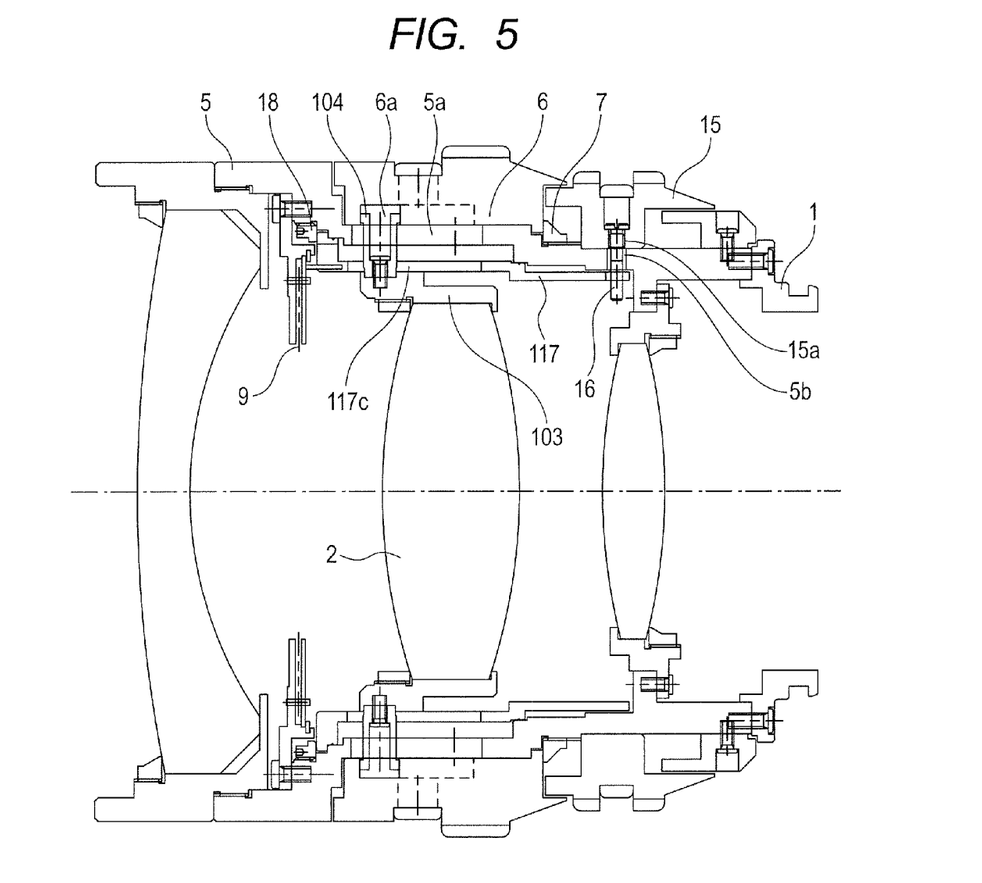
FIG. 5 is a side cross-sectional view of a lens apparatus according to a second embodiment of the present invention.

FIG. 5 is a side cross-sectional view of a lens apparatus according to a second embodiment of the present invention, and the same numeral or symbol as in the first embodiment denotes the same member. Now, a structure different from that of the first embodiment is described.

A movable lens barrel 103 holding the optical element 2 engages with an actuation transmission barrel 117 at an outer circumferential portion, and three cam pins 104 extending in directions perpendicular to the optical axis are fixed with intervals of 120 degrees around the optical axis.

In a part of the actuation transmission barrel 117 near each linear elongated opening 5a of the fixed barrel 5, openings 117c having a substantially rectangular shape are formed so as to extend in the optical axis direction and in the circumferential direction, and the cam pins 104 fixed to the movable lens barrel 103 are inserted through the openings 117c. Here, the substantially rectangular opening 117c has a width in the optical axis direction that can avoid interference with the cam pin 104 even when the movable lens barrel 103 moves in the optical axis direction from infinity to proximity in the entire range of the focus adjustment. Further, the opening 117c has an angle range that can avoid interference with the cam pin 104 even when the actuation transmission barrel 117 rotates about the optical axis in the entire range of the operational rotation angle of the stop.

The engaging portions of the actuation transmission barrel 117 and the movable lens barrel 103 are applied with lubricant so as to slide smoothly in the optical axis direction and about the optical axis.

In the lens apparatus of this embodiment, the rotation transmitting member interposed between the stop interlocking pin 15 and the cam plate 11 is a single component, that is, the actuation transmission barrel 117. Therefore, compared with a case where the rotation transmitting member is constructed by coupling multiple components, a phase shift between the stop interlocking pin 16 and the cam plate 11 due to accumulation of dimensional errors of the components and assembly variations can be minimized. In addition, the actuation transmission barrel. 117 is engaged at two positions on the object side and the image side of the linear elongated opening 5a, and hence an inclination of the actuation transmission barrel 117 caused by the movable portion backlash is very small. Thus, compared with a case where the rotation transmitting member is a long-arm cantilever plate member or the like, a delay of action of the cam plate 11 with respect to the stop interlocking pin 16 or a difference between forward and backward movements can be suppressed.

In other words, according to the lens apparatus of this embodiment, it is possible to realize highly accurate light amount adjustment that is superior in matching degree between the stop indicator and the aperture diameter, and in traceability.

Further, the lens apparatus of this embodiment has a structure in which the movable lens barrel 103 moves in the optical axis direction while engaging with the actuation transmission barrel 117. Therefore, when an external force such as impact acts on the entire lens apparatus, a load on the engaging portion can be dispersed. Therefore, even if the optical element 2 has a large mass, it is possible to suppress looseness of a cam pin fixing portion, or deformation of or damage to the cam pin 104 and the cam groove 6a.

Note that, in the embodiments described above, the linear elongated opening 5a of the fixed barrel 5, the cam groove 6a of the focus operating ring 6, and the cam pin 4 (104) that engages with the linear elongated opening 5a and the cam groove 6a and is fixed to the movable lens barrel 3 (103) constitute a rotation-translation converting mechanism as a cam mechanism for converting the rotation of the focus operating ring 6 into translation of the movable lens barrel 3 (103) in the optical axis direction. However, the present invention is not limited to this. The same action and effect can also be obtained by constructing the rotation-translation converting mechanism of a helicoid structure including a female helicoid formed on the focus operating ring 6, and a male helicoid formed on a first ring member coupled to the movable lens barrel 3 (103) and arranged on the outer circumferential portion of the fixed barrel so as to threadedly engage with the female helicoid. Further, the effect of the present invention can also be obtained by a structure in which the female helicoid is arranged as a female helicoid formed on a second ring member separately from the focus operating ring 6, and the second ring member is rotated integrally with operation of the focus operating ring 6.

In addition, in the embodiments of the present invention, a case where the lens moving in the optical axis direction in the movable lens barrel 3 (108) is a focus lens is described as an example, but the present invention is not limited to this. For instance, the same effect of the present invention can also be obtained in a case where the movable lens barrel for moving the zoom lens in the optical axis direction is arranged between the stop operating ring 15 and the movable stop 9.

Further, an image pickup apparatus (see FIG. 6) is constructed of the lens apparatus of the present invention and an image pickup element for receiving light from a subject through the lens apparatus, and thus it is possible to realize an image pickup apparatus capable of performing highly accurate light amount adjustment that is superior in matching degree between the stop indicator and the aperture diameter, and in traceability as the effect of the lens apparatus of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-288334, filed on Dec. 28, 2012 which is hereby incorporated by reference herein in its entirety.

What is claimed is:

1. A lens apparatus comprising:
   a fixed barrel;
   a first operating member rotatable in a circumferential direction and arranged on an outer side of the fixed barrel;
   a movable lens barrel arranged on an inner diameter side of the fixed barrel, the movable lens barrel holding an optical element and being movable in an optical axis direction by rotation of the first operating member;
   a movable stop arranged on the inner diameter side of the fixed barrel, the movable stop comprising a movable member rotatable to change an aperture diameter;
   a second operating member rotatable in the circumferential direction and arranged on the outer side of the fixed barrel; and
   an actuation transmission barrel engaging with the fixed barrel at a position on the inner diameter side of the fixed barrel, the actuation transmission barrel being connected to the second operating member at a first engaging portion and to the movable member of the movable stop at a second engaging portion separated from the first engaging portion in the optical axis direction, the actuation transmission barrel having an opening between the first engaging portion and the second engaging portion in the optical axis direction,
   wherein the movable lens barrel is connected to the first operating member through the opening of the actuation transmission barrel.

2. The lens apparatus according to claim 1, wherein the rotation-translation converting mechanism comprises a cam mechanism comprising:
   a pin fixed to the movable lens barrel and extending outward;
   a first cam groove in the fixed barrel; and
   a second cam groove in one of the first operating member or a ring member coupled to the first operating member, the pin engaging with the first cam groove and the second cam groove.

3. The lens apparatus according to claim 1, wherein the rotation-translation converting mechanism comprises a helicoid structure comprising:
   a male helicoid on a first ring member coupled to the movable lens barrel; and
   a female helicoid on one of the first operating member or a second ring member coupled to the first operating member,
   the female helicoid engaging with the male helicoid.

4. The lens apparatus according to claim 1, wherein:
   a maximum diameter of the movable lens barrel is larger than an inner diameter of the actuation transmission barrel, and
   a part of the actuation transmission barrel includes a cutout for allowing the movable lens barrel to be inserted in the optical axis direction.

5. The lens apparatus according to claim 1, wherein a part of an outer circumferential portion of the movable lens barrel and the actuation transmission barrel engage with each other.

6. The lens apparatus according to claim 1, wherein the opening of the actuation transmission barrel comprises multiple openings arranged in the circumferential direction.

7. An image pickup apparatus comprising:
   a lens apparatus; and
   an image pickup element for receiving light from a subject through the lens apparatus,
   wherein the lens apparatus comprises:
      a fixed barrel;
      a first operating member rotatable in a circumferential direction and arranged on an outer side of the fixed barrel;
      a movable lens barrel arranged on an inner diameter side of the fixed barrel, the movable lens barrel holding an optical element and being movable in an optical axis direction by rotation of the first operating member;
      a movable stop arranged on the inner diameter side of the fixed barrel, the movable stop comprising a movable member rotatable to change an aperture diameter;
      a second operating member rotatable in the circumferential direction and arranged on the outer side of the fixed barrel; and
      an actuation transmission barrel engaging with the fixed barrel at a position on the inner diameter side of the fixed barrel, the actuation transmission barrel being connected to the second operating member at a first engaging portion and to the movable member of the movable stop at a second engaging portion separated from the first engaging portion in the optical axis direction, the actuation transmission barrel having an opening between the first engaging portion and the second engaging portion in the optical axis direction,
      wherein the movable lens barrel is connected to the first operating member through the opening of the actuation transmission barrel.

8. The lens apparatus according to claim 1, wherein:
   the movable stop and the movable lens barrel are arranged along an optical axis direction on the inner diameter side of the fixed barrel, and
   the first operating member and the second operating member are arranged along the optical axis direction on the outer diameter side of the fixed barrel.

* * * * *